United States Patent [19]

Jupa et al.

[11] 4,145,911
[45] Mar. 27, 1979

[54] TEMPERATURE SENSITIVE LIQUID COLUMN MEASURING AND CALIBRATING APPARATUS

[76] Inventors: Edward C. Jupa, 3506 Euclid Ave., Berwyn, Ill. 60402; Arthur S. Zerfahs, 545 Woodview Ave., Elk Grove, Ill. 60007; Aaron Aronson, c/o Jurin & Associates, Inc. 10221 Franklin Ave., Franklin Park, Ill. 60131

[21] Appl. No.: 767,899

[22] Filed: Feb. 11, 1977

[51] Int. Cl.² ............................................ G01K 15/00
[52] U.S. Cl. ...................................................... 73/1 F
[58] Field of Search .......................................... 73/1 F

[56] References Cited

U.S. PATENT DOCUMENTS 3,585,839  6/1971  Bollinger ................................ 73/1 F
3,678,729  7/1972  Gels et al. ............................... 73/1 F

*Primary Examiner*—Donald O. Woodiel
*Attorney, Agent, or Firm*—Andrus, Sceales, Starke & Sawall

[57] ABSTRACT

An oil-filled thermometer tube is heated out and sealed. The tube is mounted with the bulb in a reference bath and sequentially moved through a reference station, a column height measuring station, a marking station and a sorting station. The measuring station includes a photosensitive camera having a columnar light source and a line array of photosensitive devices, which are electronically scanned to measure the column height. A plurality of sequential scans are made as a part of a pattern recognition system to insure a measurement only when an oil column has been scanned. The camera produces a digital output which is converted to an output signal to actuate a marker and a sorter at the respective stations.

12 Claims, 7 Drawing Figures

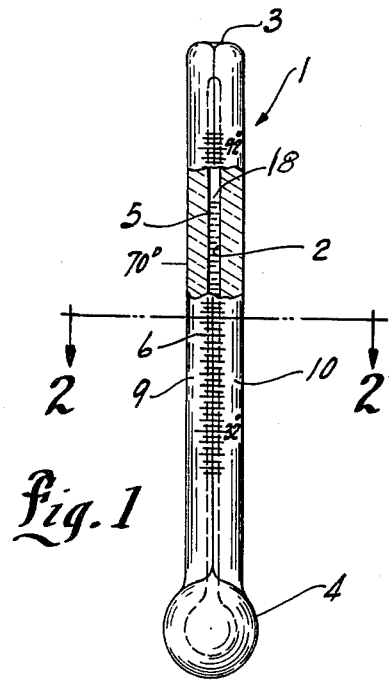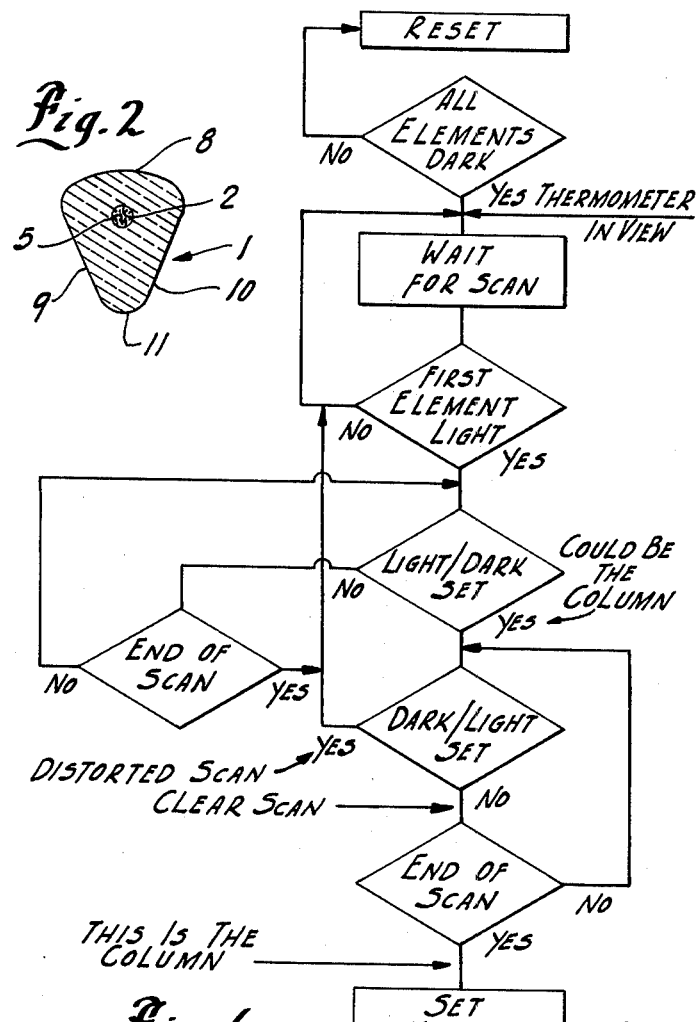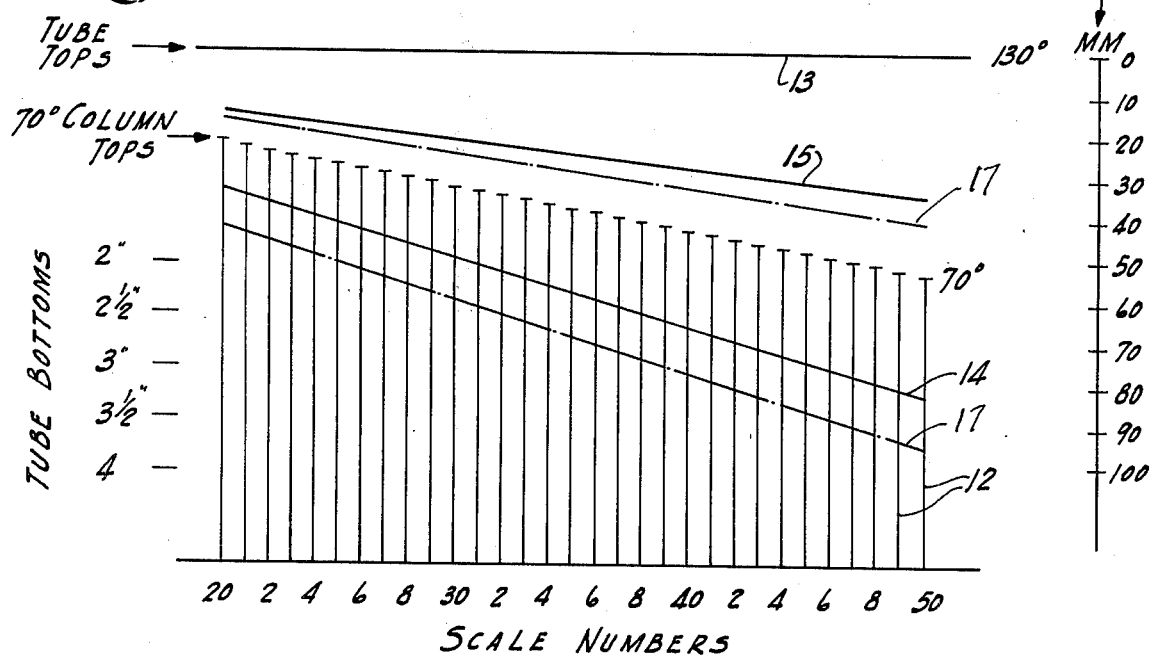

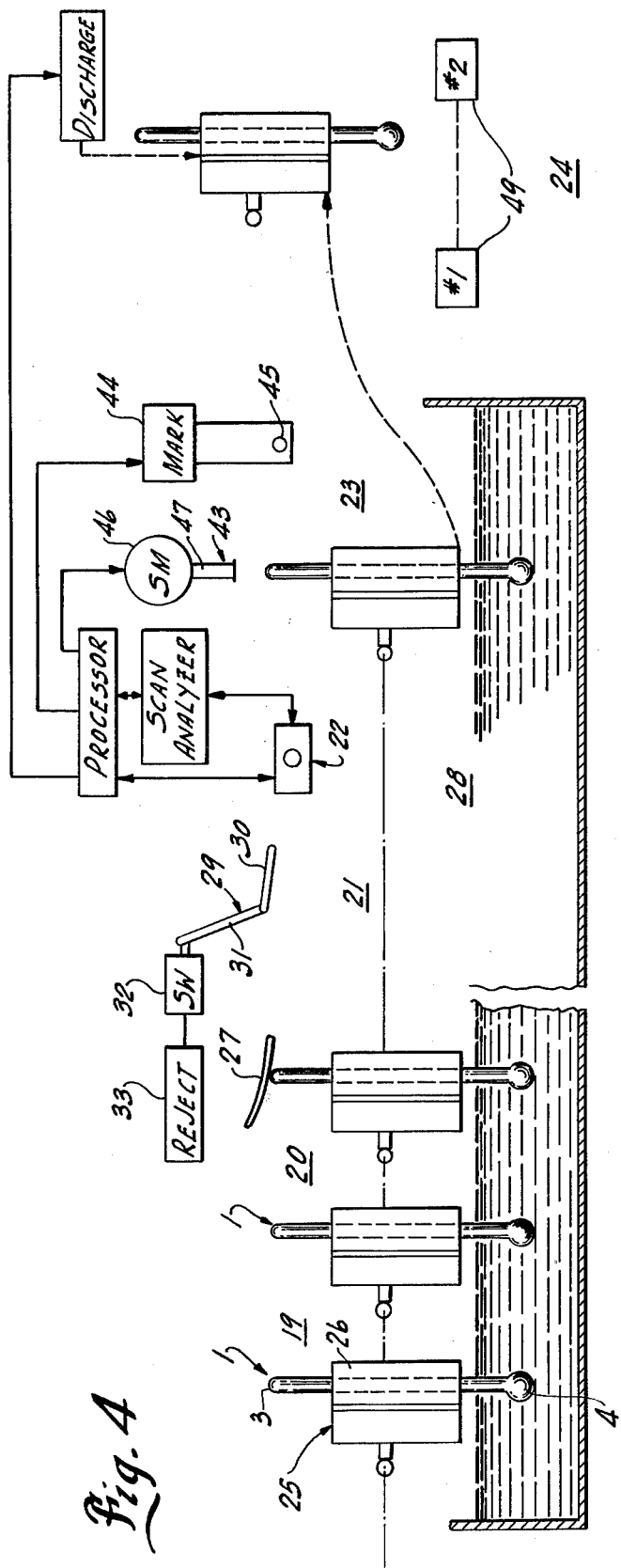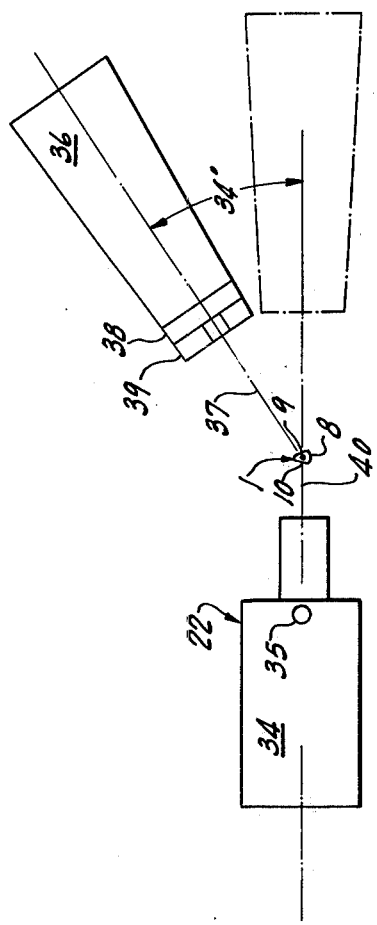

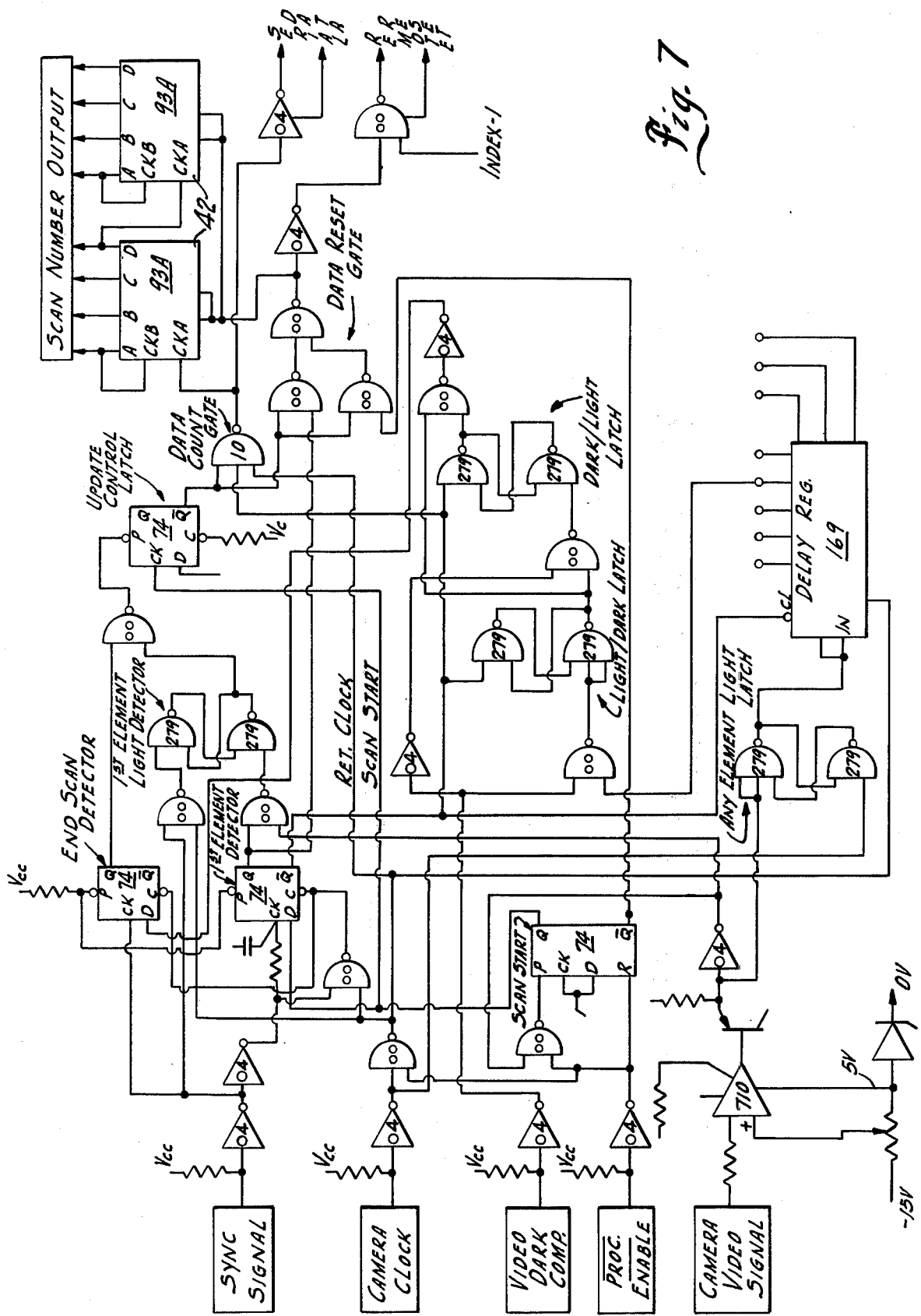

TEMPERATURE SENSITIVE LIQUID COLUMN MEASURING AND CALIBRATING APPARATUS

BACKGROUND OF THE INVENTION

This invention relates to a calibrating apparatus and method for detecting a light sensitive column within a transparent body and particularly to devices employing a fluid column of a temperature sensitive medium.

Tube-type thermometers of a conventional design employ an elongated transparent tube having a small diameter bore within which an expanding liquid is confined. The lower end of the tube is formed as a bulb forming an enlarged chamber connected to the bore. Oil is advantageously employed as an effective and low cost expandable liquid. Oil does, however, have a non-linear expansion characteristic compared to, for example, mercury and certain gases which might also be employed. In commercial production, the bulb volume and average bore diameter of each tube may vary and each tube will have its own unique characteristic dependent on the particular bulb volume and bore diameter.

Historically, each tube is "scaled" to determine the actual length of travel of the oil column for a given temperature change. The tubes are then sorted and stored by whole scale numbers. The number of millimeters of the column travel between the 32° F. point and the 92° F. temperature point of a given tube and can be used as the scale number of that tube. Historically, in the manufacture of thermometers, the tubes are formed with open tops and filled with the oil. The tube is then "heated out" to a higher than readout temperature to expand the oil to overflow.

Typically, "heat-out" temperature is either 130° F. or 150° F. The volume of fluid is thus fixed, with the particular heat-out temperature employed merely to vary the location of the actual tube scale on the tube. The tops of the heated out tubes are then sealed. They are then manually scaled and sorted by whole scale numbers for final application of a scale to the thermometer tubes. Finally in an additional manual process, each tube is "marked" at a convenient temperature point such as 70° F. so that it can be attached accurately to its appropriate scale.

Although relatively low cost, reasonably accurate and reliable thermometers are so produced, the labor intensive scaling and working process adds significantly to production costs and involves the usual problems of unavoidable human error.

SUMMARY OF THE INVENTION

The present invention is directed to a calibrating apparatus and method for determining the travel of a confined condition, temperature sensitive fluid and particularly for determining the scale number or characteristic of an oil-in-glass thermometer tube. Generally, in accordance with the present invention, the heated out tube is mounted in a reference temperature bath and the position of the top of the oil column measured with respect to the top of the tube. The inventors have found that this distance can be directly translated into the required scaling factor by appropriate modification in accordance with the coefficient of expansion for the particular oil and the heat out temperature of the tube. Thus, for any given tube, the bore has an essentially constant diameter and the calibrating is directly related to these latter two factors. The translation is directly made by the appropriate modification of the measured distance by appropriate processing device and particularly well-known electronic signal processing devices.

More particularly in one significant feature of this invention, the heated out tube is positioned in the reference path with the top at a known location. The tube is scanned by a self-scanning photosensor array camera, which scans the oil column and accurately determines the top of the oil column and generates an electronic height signal. The measured tube is then located in a marking station with the top at the same reference location and then moved relative to a marking device in accordance with the actual top of the oil column. The tube is then transferred to an automatic sorting means which employs the height signal to separate the tubes in accordance with their scale numbers.

In a highly practical system, a rotating means includes spearate support means to vertically hold a plurality of the tubes for successive movement through a sequence of stations. A position reference means moves the top of each tube to a uniform height and locates the lower end of the tube for movement through a constant temperature calibration bath of water or other appropriate liquid. While in the bath, the top height position is preferably checked to insure proper location for measurement. The tubes then pass a photosensor array camera means which determines the top of the oil column at the temperature of the bath and generates an appropriate height signal. The tube then passes to the marking station which places a mark on the tube showing the height of the fluid column at the temperature of the bath. The tube then passes to the sorting station. The sorting station removes each tube from its supports and passes it to a correct classification storage area such as a bin.

In accordance with a significant feature of this invention, the height of the fluid column is measured by a camera means having a plurality of in-line photosensitive devices which are in a closely spaced array. The array is aligned with the thermometer fluid column and by reading the array the height of the column determined. A light source directs a beam for illuminating the array. In monitoring the fluid column, the beam is angularly oriented with respect to the view line of the array and engages the fluid column which reflects the light into the array. A commercially available camera means includes means for rapid and repetitive electronic scanning of the array and producing a digital signal count corresponding to the energized devices and thereby a digital number which is a measure of the height of the column. The conventional thermometer tube is generally formed of glass tubing with a triangular cross-section and with the bore formed adjacent a base portion. The tube is moved past the camera and light source with the base portion as the leading wall. The light beams enter through a side of the triangular tube. The glass tube has been found to create reflections which can reflect the light beam and thus actuate the array, giving a false indication of a column. A particularly unique means of detecting the actual fluid column is provided by detecting a light sequence pattern in successive scans of the array as the tube moves past the camera means. Generally, the successive scans first check for a totally dark condition followed by a next scan in which a first light element is present and, when present, determine whether such first element and any following light elements are followed by a dark element. Only if the latter state is present is a column assumed possible. If not, the scans are reinitiated. If such state exists, the scan end is checked and the light/dark set repeated if it is not the end of the scan and if it exists, an opposite dark/light set condition checked to reject a distorted pattern. If such exists, the system restates from the first condition, but if not, the end of the scan is determined. If not, the dark/light set is repeated until the end of scan exists at which time, the output of the array is read. Thus, the output of the photosensitive device may be set in an up date latch means and the reading taken. The reading is a direct measurement of the column height and thus a measurement of the distance of the top of the column from the top of the tube. This reading is converted by the camera into an output signal which may be employed for the automated scaling of the thermometer.

The present invention has been found to provide a reliable and practical apparatus and method for production scaling and working of confined condition sensitive fluids and particularly of oil-in-glass thermometer tubes.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings:

FIG. 1 is an elevational view of an oil-in-glass thermometer;

FIG. 2 is a transverse section taken on line 2—2 of FIG. 1;

FIG. 3 is a graphical illustration of the characteristic of such tubes having different scale numbers;

FIG. 4 is an illustration of a marking and scaling apparatus in accordance with the present invention;

FIG. 5 is a diagrammatic view of one of the tubes in FIG. 4 relative to a camera means;

FIG. 6 is a flow or logic diagram for a pattern recognization; and

FIG. 7 is a diagram of a scan analyzer for measuring the height of an oil column.

DESCRIPTION OF ILLUSTRATED EMBODIMENT

Referring particularly to FIG. 1, a common oil-in-glass thermometer unit is illustrated including a transparent capillary tube 1 formed of glass or other suitable material. The tube 1 has a small bore 2 which is sealed at the upper end as at 3 and which is enlarged into a bulb 4 at the bottom. The bulb 4 and extended bore 2 contains a suitable oil 5. When heated, the oil 5 expands; and when cooled, contracts. The small bore 2 results in a readily visibly detected rise and fall within the tube with such expansion and contraction. The tube 1 is provided with a temperature scale 6 attached in appropriate position to tube 1. The scale 6 is divided into equal parts, each division being a one degree change. The tube 1 is preferably formed, as shown in FIG. 2, with a triangular cross section having a curved base wall 8 connected to flat adjacent walls 9 and 10 joined by a curved junction wall 11. The bore 2 is formed adjacent the curved base wall 8 and generally in alignment with the connection to the flat walls 9 and 10.

The particular movement or travel of oil 5 within tube 1 is dependent on its temperature coefficient, size of bore 2 and the volume of bulb 4. As the latter two factors normally vary from tube to tube in practical manufacture processes, the correct scale must be determined for each particular tube. Generally, the tubes are scaled by a whole number change of mm. in the travel of the oil column between 32° F. and 92° F. The present invention is directed to automating the scaling and marking processes. The volume of oil 5 in the tube 1 is fixed during the process of manufacture as in the process of manual scaling. Thus, the tube 1 is formed as an open top member, filled with oil 5 and heated to heat out temperature of 130° F. or 150° F., as previous noted. The particular heat out temperature merely establishes the moving range of the oil 5 in response to the normal temperature conditions for which the thermometer is designed, as also shown in FIG. 3, with a reference point of 70° F. also shown for reference to the subsequent description of the present invention.

In FIG. 3, each solid vertical line 12 represents an oil-in-glass tube 1 having the scale number shown on the abscissa, with the top of each tube on the common horizontal line 13 and the bottom end at the portions shown on the left ordinate for tubes of various over-all lengths. The 32° F. temperature line 14 and the 92° F. temperature line 15 are also shown. The distance between lines 14 and 15 for any given tube 1 corresponds in millimeters as shown by the vertical scale 16, shown to the right of FIG. 3, and reading from the tube top line 13. Thus, when a tube is heated to 150° F. and then cooled to 70° F., the position of the top of the oil column in the tube varies with the scale number progressively decreasing with increasing scale numbers, indicating a greater change in position per degree temperature change. Correspondingly, the distance in mm the top of the column moves between 32° F. and 92° F. increases with and corresponds to the scale number.

The same characteristic is exhibited if the open top tubes are heated to only 130° F., the position of the top of the oil column merely being shifted upwardly for any given temperature, as shown by the three phantom reference temperature lines 17. The same general shift would result from use of any other heat out temperature.

Each tube 1 of FIG. 3 needs a separate scale 6 to accurately relate the top 18 of the oil column to the temperature. Tubes 1 having characteristics intermediate the scale numbers are placed with the closest scale number as the inaccuracy is within the normal acceptable tolerances and would otherwise disproportionately increase the cost.

The present invention is based on the realization and teaching of the characteristic of FIG. 3 which leads to the teaching that the calibration scale number can be determined by translation of a reference distance, such as that to the 70° F. point. For example, for refined thermometer oil, it has been determined that the movement can be defined by the equation:

$$h = S/30 \, [0.446111 \, (T) + 0.000278 \, (T)^2]$$

where S is the scale number T is the temperature above 0° F. and h is the distance from the 0° F. point to the top of the column at the temperature T. Combining the equation for the 70° F. point and for the heat out temperature results in:

$$X = S/30 \, \{[0.466111 \, T_{ho} + 0.00278 \, T_{ho}^2] - [0.466111(70) + 0.000278(70)^2]\}$$

where X is the distance between 70° F. and the tube top and $T_{ho}$ is the heat out temperature. The latter equation further appropriately defines the relationship of X = 1.4065 S for tubes of 150° F. heat out and X = 1.0435 S for tubes of 130° F. heat-out, which constitutes the appropriate modification of 70° F.-to-tube top distance to obtain the proper scale number.

Referring particularly to FIG. 4, an apparatus is illustrated for measuring, marking and sorting of heated out tubes. Generally, the apparatus includes a loading station 19, a top reference locating station 20, a reference heating station 21 which includes a unique photosensor station 22 for measuring the top level 18 of the oil column 5, a 70° F. tube marking station 23 and finally a tube sorting station 24. The apparatus is shown with an inline flow system and with the several devices shown in simplified illustration for purposes of clearly disclosing a preferred embodiment of the present invention.

More particularly, heated out and sealed tubes 1 are loaded in individual holders or supports 25 at the loading station 19. The tubes 1 may be manually loaded, or suitable automated insertion means of any suitable construction may be provided. The supports 25 are shown as having releasable clamping jaws 26 holding the tubes 1 in a vertical direction with the sealed end 3 located above the jaws 26 and the bulb 4 located beneath the jaws 26. The supports 25 are suitably interconnected to each other and to a drive means to provide a synchronized movement of the several supports through the several stations 19-24.

From the loading station 19, the tubes 1 move through the top reference locating station 20 where each tube is located with the top 3 in the same vertical position. In FIG. 4, a reference gage plate 27 is mounted in the path of the sealed tube ends 3. The plate has a raised input end which curves smoothly down a discharge end in the desired vertical plane for locating the top end of the tubes at a uniform height to ensure proper immersion of the tube bulb 4 in a heating bath unit 28.

The bath unit 28 is a tank means containing water, or other suitable liquid, for heating of the bulb and therefore the oil to the selected reference point temperature of 70° F.

The illustrated tank means 28 is shown extending from the loading station 29 but may, of course, be separately found, with the supports 25 moved vertically into the tank means.

The water is held at the reference temperature of 70° F. with a suitable tolerance such as ±0.10° F. and the tubes are immersed to achieve proper heating within a minimum time period. The temperature is preferably monitored and the system operation halted whenever the water bath temperature deviates beyond an acceptable range.

The tube 1 is moved through the bath and just before reaching the camera unit 22, a tube top position sensor 29 again checks the vertical high position of the tube 1. The illustrated sensor 29 is an L-shaped arm pivotally mounted with the short leg 30 located in the path of any tube top abnormally high. The longer leg 31 projects upwardly with the outer end aligned with a switch 32. The long leg 31 provides mechanical amplification of the short leg movement. Actuation of the switch 32 activates a reject mechanism 33, which may provide for manual removal or operate the sorter 24 to segregate the rejected tubes 1. The switch 32 may be a suitable mechanical switch, photosensitive switch means or the like.

The height checked tube 1 is then moved past through the top column measuring station 21 in which the oil column 5 is scanned by camera unit 22 to electronically determine and generate a signal proportionally to the height of the top 18 of the oil column 5 and therefore the distance from the tube top 3 to the top 18 of the oil column 5. The bulb 4 of the tube 1 is still immersed in the water bath 28 and the top 18 of the oil column 5 is at the 70° F. mark.

Although any suitable detecting means can be employed, a unique scanning means employs a self-scanning photosensor array camera 34. A particularly satisfactory camera is a Model LC 600 digital line scan camera manufactured and sold by Reticon Corp. of Mountain View, California and described in a descriptive brochure copyrighted in 1974.

Generally, the camera 34 includes a line diode array 35 defining a scanning column which is aligned with column 5. The camera 34 includes a lens which provides for looking at an appropriate length of the oil column 5. A light source 36 is mounted to the opposite side of the tube 1 and generates a light beam 37 passing through the bulb to the camera 34 with the transmission varying with the oil column. The light beam 37 is transmitted onto the photodiode array 35 which is scanned electronically. A train of analog electrical pulses each having an amplitude proportional to the light intensity on the corresponding photodiodes is generated. These pulses are compared to a preset threshold level to produce a train of binary pulses—logical zero for light below threshold (black) and logical one for light levels above threshold (white). The pulses before or after a black-white transition can be electronically counted to determine the position of the top surface of the oil column. Where a ten scale classification in 1 mm. increments are employed, the camera's effective view should be at least 10 mm. (0.394 inches). An aperture member 1 may be designed to define the field of view. A filter 38 may be located between the light source 36 and aperture member 39. The digital output signal which is provided which is a direct measurement of the distance from the top of the oil column to the tube top. The signal therefore also directly identifies the location on that tube for the 70° F. scale mark.

The inventors have found that the thermometer tube 1 creates a reflection and refraction of light beam 37 in the body of tube 1, which in a dynamic mode may cause the camera to detect patterns of light and dark areas other than that of the oil column 5. The column 5 reading is isolated by a pattern recognition system as well as an optimum positioning of the light source 36 and camera 34 relative to the tube body.

In particular, as shown in FIG. 5, the camera 34 is located with its view line 40 generally perpendicular to that of the tube motion. The light is angularly oriented to direct the light beam 37 to the leading side of camera 34 in accordance with the cross sectional configuration of the thermometer tube 1. Thus, the tubes 1 are held in the support with the curved base wall 8 moving as the forward or front portion of the tube 1 and with the sidewall connecting portion 11 as the trailing or rear portion of the tube 1.

The light source orientation is such that the light beam 37 passes centrally through a sidewall 9 in alignment with the bore 2. The output of the diode array 35 measures the location of column 5 and in particular the location of the top level 18 relative to the tops of tube 1. The output is a digital signal which may be applied to a suitable controller 41 which are also available from Reticon. The pattern recognition is established by a predetermined sequence of patterns related to the scanning of a tube 1. The logic sequence is shown in FIG. 6.

The sequence includes detecting a first scan in which all elements are detected as dark; i.e., that none of the light beam 37 is reflected and thus no thermometer 1 is in alignment with the camera 34 and light source 36. This is detected as a series of all logic "0"s from the diode array 35.

The next step in the sequence is a scan in which the first element of the array is light and thus at a logic "1" and thus a thermometer 1 may be assumed to be located to reflect the light beam 37. Thus, the camera 34 waits for the first scan in which the first element light is detected, a light/dark elements set check is made for that scan. Thus, the light element or elements must be followed by dark elements. This is detected by presence of a logic "0".

Thus, if all elements are light, the oil column 5 is not being scanned and the camera 34 is reset to the position of waiting for the next scan beginning with a light element, or logic "1" and the possibility that such scan is of the oil column 5. If the light/dark set appears in the scan, the unit checks for a dark/light set in the same scan. The latter would indicate that the oil column 5 is not scanned as it presents a clear light/dark set only. If a dark light set or pattern is detected in the scan, the camera therefor returns to again detect a scan with a first element light.

If a dark/light set or pattern does not exist to the end of this scan, a clear light/dark set exists and insures a clear scan has occurred of the oil column 5. The update latches 42 of the elements of the diode array set to record the detected pattern of the array 35. The latches 42 are read to produce a corresponding digital output signal proportional to the measurement between the top of the oil column and the present top tube height of the tubes.

The controller applies the output signal to the marking station 23 and to the sorter station 24. The marking station 23 includes a tube repositioning means 43 for the vertical repositioning of the tube 1 relative to a tube marker 44 having a vertically fixed marking element 45.

The tube repositioning means 43 is actuated by the digital output signal of the controller to push the tube 1 down to align the top of the oil column 5 at 70° F. with the marking element 45. A particularly satisfactory repositioning means may employ a stepping motor 46 to raise a gear coupled plunger 47 between positioning periods to a known starting or reference position and lower the plunger 47 to move the tube 1 down to a proper position in accordance with the signal from the camera controller 42.

The marking element 45 is located in the path of the tube 1 and applies a black line 48 on the adjacent rear corner of the tube 1. The ink mark 48 is preferably permanent and visible when viewing the thermometer from the front.

The camera height signal is modified to a scale number related signal. The sorter 24 responds to such signal in synchronism with the movement of the support to release each tube 1 from its support jaws 26 into a proper classification bin 49. Thus, the camera height signal may be directly stored, with modification before or after storage, and then applied in synchronism with movement of the tube past the bins to release the tube to the appropriate bin.

The storage system is preferably capable of retaining the rejection data, height signal information or data and the like until replaced. If the machine operation is temporarily interrupted and again restarted, the necessary data for processing the tube in the apparatus is retained. The synchronous movement of the holders and coupled tube with a storage means may be readily provided and no further description of such conventional synchronizing control is presented.

The digital pulse signals of the camera may be processed in any suitable scan analyzer controlled circuit. A practical and satisfactory scan analyzer control circuit is illustrated in FIG. 6 employing standard logic components which will be readily recognized by those skilled in the art. The scan analyzer and subsequent processing preferably employs a suitable microprocessor such as that manufactured by Intel Corporation of California. Although any suitable logic and timing means may be employed. The processor is used in a standard manipulation of the data and generally controls the interrelated sequential operation of the camera, the scan analyzer as well as the actuation of the marking unit and the sorter. The programming is in accordance with conventional practice and can be readily provided through the use of the instructions, assembler and the like provided by Intel Corporation or other sources with their microprocessors.

More particularly, in the illustrated embodiment of FIG. 7, the scan analyzer includes a plurality of logic devices such as conventional latches, flip-flop circuits and the like which are connected to provide sequential detection of the characteristics of the camera and produce a digital level measurement number, in response to the previously described pattern recognition.

In particular, the illustrated circuit includes a scan start latch having an input connected to the video or camera signal through a suitable amplifying and shaping circuit. The video signal is gated with a processor enable control signal to insure synchronized operation of the systems. The processor enable signal is also ANDED with a camera clock signal, the output of which is connected to provided clock signals to several elements of the scan analyzer and thereby establish synchronized operation, with the input of the video logic signals. The high and low outputs of the scan start latch are connected to control a first element detector latch, an update control latch, and a data reset gate logic unit. The output of the latter is connected to reset the scan data register or memory in which the number of proper scan is placed for appropriate operation of the marker and sorter.

An any-element-light-latch is a dual input flip-flop circuit having a first input connected to camera signal and second input connected to the camera clock signal. Whenever a light element is detected by the camera, an input is latched to a register, the output of which is connected to interlock the sequence detection means. In particular, the register is connected to actuate a light-/dark detection unit also shown as a flip-flop latch. Thus, the light/dark latch includes a two input NAND gate, having one input connected to the register and the second input connected to a dark complement video signal of the camera. The second input of the light/dark flip-flop latch is connected to the output of a first element detector. The circuit must first be conditioned to indicate the possible presence of the column followed by a light to dark conversion in the tube 1, at which time the light/dark latch is set. The output is connected to one input of a dark/light latch by a two input NAND gate, the second input of which is connected by an inverter to the output of the dark complement input from the camera. The dark/light latch is a similar flip-flop circuit. The second input of the dark/light latch is connected to the output of the first element detector and the latch is set only when the light/dark latch has been set, and then creation of a following light signal.

A first element light detector is a similar flip-flop unit, having one input NANDED to the first element detector and to camera clock. The second input is NANDED to the camera clock line and to an enable or synchronizing signal source developed by the processor. This signal source is also applied to the first element detector and to an end scan detector. The output of the first element light latch is NANDED with the output of the end scan detector and provides a control signal to actuate the update control latch. The end scan latch detector is controlled by the output of the dark/light latch and the update is triggered only when a first element light is created followed by at least a light/dark change created to actuate the update control latch.

The data count gate is actuated to transmit and actuate the data scan member registers only when the particular clear sequence is created. If the analyzer detects a first element light latch, a light /dark latch, followed by a dark/light sequence, the data count gate is closed, the data reset gate activated to reset the scan data registers and then wait for a next proper scan.

If a clear scan is detected, the registers are updated, the register outputs are read by the processor and the digital numbers converted to appropriate signals for operating the positioning stepper motor 43 and marker 47 and the sorter 24.

Various modes of carrying out the invention are contemplated as being within the scope of the following claims, particularly pointing out and distinctly claiming the subject matter which is regarded as the invention.

We claim:

1. An apparatus for sequentially measuring the characteristic movement of liquid in an elongated tubular bore of a thermometer tube, said tube including a liquid just sufficient to completely fill the bore at a selected heat-out reference temperature, means to heat the liquid to a reference temperature below said heat-out temperature and locating the top level of the liquid intermediate the length of the bore, level reading means for reading the location of the top level of the liquid in the tube and producing a signal proportional to the distance from the top of the tube, and means to sort the thermometers in accordance with the location of the top level of the column at said reference temperature relative to the top of the tube.

2. The apparatus of claim 1 including marking means, having a marking element for placing of an identifying mark on the tube, and means for aligning of the tube and marking means with the marking element aligned with the top level of the liquid in the tube.

3. The apparatus of claim 2 including locating means for locating the tube with the upper end at a predetermined reference height, and said level reading means including a camera means including photosensitive means aligned with the liquid and said signal is a digital signal.

4. The apparatus of claim 3 wherein a signal pulse means generates a pulse train proportional to said signal, and said locating means is a stepping motor connected to said signal pulse means.

5. Apparatus of claim 1 wherein the thermometer tube is a glass tube having a triangular cross-section including a curved base leg connected to a pair of relatively flat legs, said bore being formed within said body within a portion adjacent the base leg, a releasable clamp supports the tube with the base wall generally perpendicular to the direction of movement, said level reading means is a camera means having a line array of detecting elements, and a columnar light source is located to direct a beam of light into the body through the flat wall opposite the array of camera unit.

6. The apparatus of claim 1 wherein the level reading means includes a camera means having a line array of a multiple of photosensitive elements and means to scan and sequentially read said elements and produce an individual output signal of a first level in the absence of said column or a second level in the presence of said column for each element whereby said signal is proportional to the number of signals at said second level.

7. The apparatus of claim 6 including a transport means for relatively moving of the tube and the camera means, and a sequence controller including a pattern recognition means for detecting the presence of the liquid column.

8. The apparatus of claim 7 wherein said pattern recognition means includes logic means responsive to a common signal logic scan including the same element signal at the first level for each element and operative to activate a second scan detector means, said second scan detector means being responsive to a scan including an initial element signal of the second level to activate a logic second-to-first-level change detector means and responsive to said level change detector to activate a second logic first-to-second-level change, said second detector means resetting the second scan detector means and actuating a clear scan detector means for storing the state of the elements in said second scan.

9. An apparatus for sequentially measuring the characteristic movement of liquid column in an elongated tubular bore of a tube including means for locating the tube with the upper end at a predetermined reference height, said tube including a liquid just sufficient to completely fill the bore at a selected heat-out reference temperature, means to heat the liquid to a reference temperature below said heat-out temperature and locating the top level of the liquid intermediate the length of the bore, means for reading the location of the top level in the tube, a marking element for marking said tube in accordance with said top level location, means for aligning the tube with said marking element, and means to sort the tubes in accordance with the location of the top level of the column.

10. Apparatus for measuring the height at column of material confined within a bore in a transparent body, comprising a line scan unit including a line array of a multiple of photosensitive elements, said scan unit having means to repetitively and sequentially read said elements, and produce an individial output signal of a first or a second level with the element illuminated for each element, a transport means for relatively moving of the body and the scan unit, a sequence controller including means responsive to a common signal logic scan including the same element signal at the first level for each element and operative to activate a second scan detector means, said second scan monitor means being responsive to a scan including an initial element signal of the second level to activate a logic second to first level change detector means and responsive to said level change detector to activate a second logic first to second level change, said second detector resetting the second scan monitor means and actuating a clear scan detector means for storing the state of the elements in said second scan.

11. Apparatus of claim 10 wherein said scan unit includes a light source creating a columnar beam aligned with the transparent body and column, said light source being offset from the plane of the elements and reflected by said column onto said elements.

12. Apparatus of claim 11 wherein the body has a generally triangular cross-section including a curved base leg connected to a pair of relatively flat walls, said bore being formed within said body within a portion adjacent the base leg, said transport means is a releasable clamp supporting the tube with the base wall generally perpendicular to the direction of movement, said light source being located to direct the beam into the body through the flat wall opposite the array of scan unit.

* * * * *

UNITED STATES PATENT AND TRADEMARK OFFICE
CERTIFICATE OF CORRECTION

PATENT NO. : 4,145,911
DATED : March 27, 1979
INVENTOR(S) : Edward C. Jupa, Arthur S. Zerfahs & Aaron Aronson It is certified that error appears in the above-identified patent and that said Letters Patent are hereby corrected as shown below:

Top Page, Under Item 22, insert -- (Under 37 CFR 1.47) --.

| | | |
|---|---|---|
| Column 4, | Line 64, | After "X=" cancel "S/30" and insert --- $\frac{S}{30}$ ---; |
| Column 5, | Line 43, | After "station" cancel "29" and insert --- 19 ---; |
| Column 7, | Line 26, | Before "set" cancel "dark light" and insert --- dark/light ---; |
| Column 8, | Line 40, | After "to" cancel "provided" and insert --- provide ---; |
| Column 8, | Line 56, | After "light" (end of line) cancel the "hyphen". |

Signed and Sealed this

*Thirtieth* Day of *October 1979*

[SEAL]

*Attest:*

RUTH C. MASON
*Attesting Officer*

LUTRELLE F. PARKER
*Acting Commissioner of Patents and Trademarks*